United States Patent [19]

Rawson et al.

[11] Patent Number: 5,692,204

[45] Date of Patent: Nov. 25, 1997

[54] METHOD AND APPARATUS FOR COMPUTER SYSTEM POWER MANAGEMENT

[75] Inventors: Andrew Radcliffe Rawson, Cedar Park, Tex.; Guy Gil Sotomayor, Jr., West Palm Beach, Fla.

[73] Assignee: International Business Machines Corporation, Armonk, N.Y.

[21] Appl. No.: 666,149

[22] Filed: Jun. 19, 1996

Related U.S. Application Data

[63] Continuation of Ser. No. 388,960, Feb. 15, 1995, abandoned.

[51] Int. Cl.$^6$ ........................................................ G06F 1/32
[52] U.S. Cl. ............................................................. 395/750
[58] Field of Search ................................. 395/750; 364/707

[56] References Cited

U.S. PATENT DOCUMENTS

| | | | |
|---|---|---|---|
| 5,142,684 | 8/1992 | Perry et al. | 395/750 |
| 5,148,546 | 9/1992 | Blodgett | 395/750 |
| 5,254,888 | 10/1993 | Lee et al. | 307/480 |
| 5,313,108 | 5/1994 | Lee et al. | 307/267 |
| 5,339,392 | 8/1994 | Risberg et al. | 395/161 |
| 5,339,445 | 8/1994 | Gasztonyi | 395/750 |
| 5,355,501 | 10/1994 | Gross et al. | 395/750 |
| 5,361,364 | 11/1994 | Nagashige et al. | 395/750 |
| 5,379,436 | 1/1995 | Tanaka | 395/750 |
| 5,412,585 | 5/1995 | Hamilton et al. | 395/750 |
| 5,414,860 | 5/1995 | Canova, Jr. et al. | 395/750 |
| 5,414,863 | 5/1995 | Lee et al. | 395/750 |
| 5,446,852 | 8/1995 | Hilpert et al. | 395/750 |
| 5,452,277 | 9/1995 | Bajorek et al. | 395/750 |
| 5,461,266 | 10/1995 | Koreeda et al. | 395/750 |
| 5,469,553 | 11/1995 | Patrick | 395/750 |
| 5,560,022 | 9/1996 | Dunstan et al. | 395/750 |
| 5,564,015 | 10/1996 | Bunnell | 395/184.01 |

FOREIGN PATENT DOCUMENTS

2235797A  3/1991  European Pat. Off. .

OTHER PUBLICATIONS

Rev. 1.1 (C) 1993 Intel, Microsoft, APM Interface Specification, Sep. 1993, "Advanced Power Management (APM) Bios Interface Specification," p. i through p. 59.

*Primary Examiner*—Ayaz R. Sheikh
*Attorney, Agent, or Firm*—Volel Emile; Paul S. Drake

[57] ABSTRACT

A method and apparatus for managing power states of at least one hardware resource, including registering at least one hardware resource power state corresponding to a software process, determining whether a current hardware resource power state fulfills the registered hardware resource power state corresponding to the software process, and modifying the current hardware resource power state that is determined not to fulfill the registered hardware resource power state prior to executing the software process.

46 Claims, 7 Drawing Sheets

METHOD AND APPARATUS FOR COMPUTER SYSTEM POWER MANAGEMENT

This is a continuation of application Ser. No. 08/388,960, filed on Feb. 15, 1995, now abandoned.

TECHNICAL FIELD

The present invention relates generally to power management in computer systems and more particularly to a method and apparatus for registration of resource requirements in a power managed computer system.

BACKGROUND ART

Power management is a mechanism (hardware, software, or a combination of both) which regulates the power consumption of a computer system. Some of the first applications of power management in a computer system were to extend the useful operating time of portable battery-operated computers. However, this technology is also being applied in the design of energy-conserving, non-mobile, AC-powered computers.

One technique is to put devices which are not currently in use into low-power modes of operation. For example, the platter motor may be turned off for a disk drive which is not being used, thereby reducing the power consumption of the disk drive. However, this would prevent the disk drive from responding to a request for information for a longer period of time than if the platter motor were not turned off. As a result, power management features typically have trade-offs between reduced power consumption and reduced resource availability.

Some prior art solutions rely on reducing the clocking rate to various subsystems (e.g. the CPU, memory controller, and/or peripheral bus controller) to reduce their power consumption during times when the demand for these resources are low. While this technique does reduce average power consumption, the system software is unaware that certain resources may not be available. As a result, latency may be increased and overall throughput may be decreased when system or application software require a resource which was previously placed at a reduced clock rate.

Other prior art solutions use a cooperative approach wherein hardware communicates, via system firmware, with a central power management executive in the operating system to manage the power state of system devices. An example of this approach is the Advanced Power Management (APM) provided by Intel Corporation and Microsoft Corporation and the various operating systems, such as Windows (trademark of Microsoft Corp.) and OS/2 (trademark of IBM Corp.), which employ APM. In this approach both system firmware and specifically enabled power management-aware applications communicate with a central power management executive. Power management event notification messages are passed up from devices through the power management extended system firmware to the power management executive and requests for system power state transitions are passed down from the applications software. This provides a more adaptive approach to power management, but still involves many trade-offs between reduced power consumption and reduced resource availability.

DISCLOSURE OF THE INVENTION

The present invention includes a method and apparatus for managing power states of at least one hardware resource, including registering at least one hardware resource power state corresponding to a software process, determining whether a current hardware resource power state fulfills the registered hardware resource power state corresponding to the software process, and modifying the current hardware resource power state that is determined not to fulfill the registered hardware resource power state prior to executing the software process.

A further understanding of the nature and advantages of the present invention may be realized by reference to the remaining portions of the specification and the drawings.

BEST MODE FOR CARRYING OUT THE INVENTION

This disclosure describes an improved method and apparatus for power management. In the preferred embodiment, techniques are provided for a software application developer to register the hardware resource requirements of his application with the operating system. This makes it possible for the operating system to schedule the execution of the application or processes within the software application in a manner which takes into consideration a power state required by the application and the current operational mode or power state of the various devices (hardware resources) required by the application to successfully execute in the system. An automatic method of generating a set of hardware resource requirements for a given application is also provided.

Unlike the prior art where applications do not provide to the power management software/hardware any clues as to what system resources the application requires, this approach may eliminate the need for application program resource usage prediction algorithms and improve the potential for more optimal utilization of power by providing more timely and more accurate information concerning the resource requirements of all active applications to the power management software/hardware.

Figure 1:
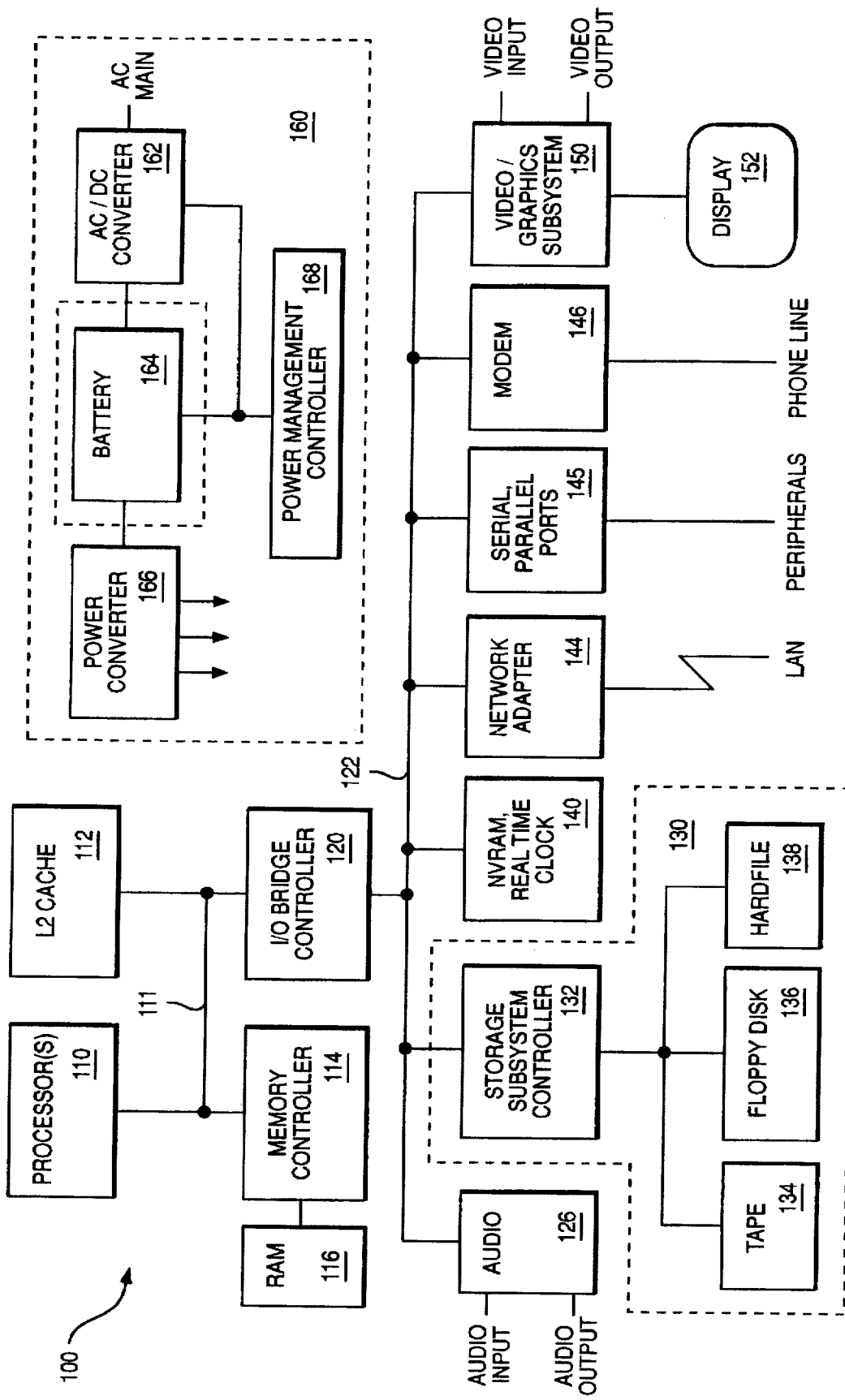
FIG. 1 is a diagram of a typical digital computer utilized by a preferred embodiment of the invention.

FIG. 1 is a block diagram of a typical digital computer 100 utilized by a preferred embodiment of the invention. The computer includes main processor(s) 110 coupled across a processor bus 111 to an L2 cache 112 and to a random access memory (RAM) 116 via memory controller 114.

The main processor(s) is also coupled to various subsystems on a bus 122 via I/O bridge controller 120. Bus 122 may be one of various types of busses such as Micro Channel (trademark of IBM Corp.) or PCI. Various subsystems (types of hardware resources) may be coupled to bus 122. These subsystems may include audio 126 with audio input and output for handling audio information for applications such as multimedia. Storage subsystem 130 may be included for storage and retrieval of data with controller 132, tape system 134, floppy disk system 136 (or other removable storage media systems) and hardfile system 138. A non-volatile RAM (NVRAM) and real time clock 140 may be included. The tape system, hardfile system, floppy disk system or other removable media systems, L2 cache, RAM, NVRAM, and other types of hardware resources for storing data known in the art, are referred to herein as memory. A network adapter 144 may be included for communications with other computer systems across a local area network (LAN). Various serial or parallel ports 145 may be included for communicating with various peripherals such as printers. A modem 146 may be used for communications with other computer or other types of electronic systems across phone lines. In addition, a video/ graphics subsystem 150 may be included for displaying information on a display 152 or for receiving video information from devices such as video cameras or VCRs and for sending video information to video recording devices or monitors. Of course, many other types of subsystems may be included which utilize the present invention.

Also included in computer 100 is power management hardware 160 which includes an AC/DC converter 162 coupled to an AC power input, a battery 164, a power converter 166, and a power management controller 168. Although the battery is typically used in battery powered systems, such as laptops, it may also be used in other systems to provide an uninterruptable source of power. The power converter 166 is coupled (not shown) to each of the elements described above for providing power to those elements.

In the preferred embodiment, the power management controller provides some residual event sensing capability. This capability is particularly useful during times when the central processor is not functioning due to having been placed in a low-power state in order to save power. The power management controller preferably acts as a slave to the central processor and sends signals to various subsystems to vary their power states. In addition, it preferably has autonomous functions such as controlling the power converter which supplies operational power to the various computer subsystems. In a battery powered system, the power management controller may also be active in controlling the process of charging the battery.

Figure 2:
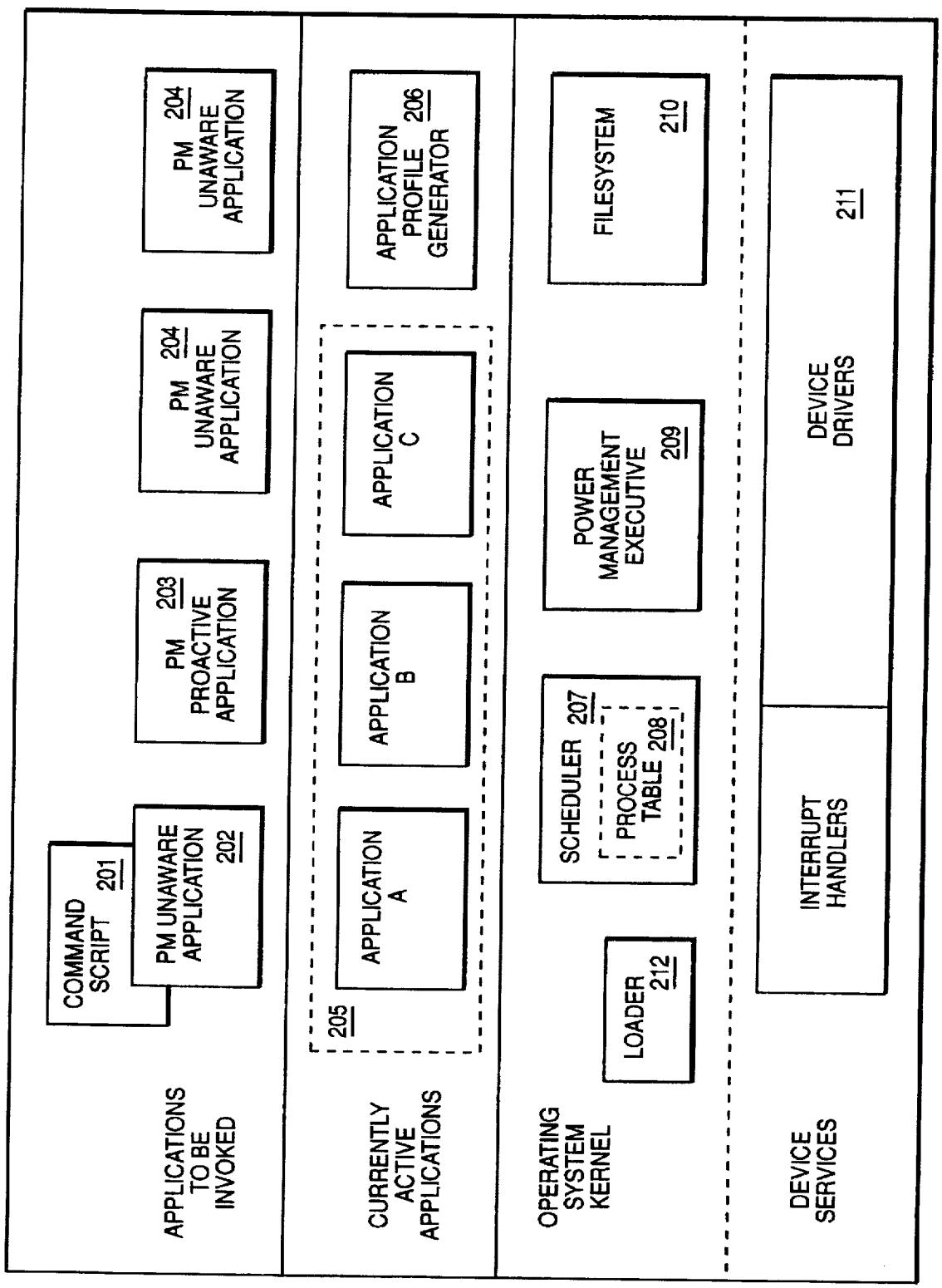
FIG. 2 is a layered block diagram which conceptually illustrates a power management enabled operating system and a set of application programs according to the preferred embodiment of the invention.

In the preferred embodiment, the power management features of the present invention are utilized by operating system software which provides optimal utilization of electrical power under varying user application workloads. FIG. 2 is a layered block diagram which conceptually illustrates a power management enabled operating system and a set of active and yet to be active application programs. This operating system may be either a cooperative or preemptive multitasking operating system. That is, at any given time there may be one or more active applications which are sharing the hardware resources of the computer system.

The top layer of the diagram shows a set of applications 202, 203 and 204 waiting for invocation. These applications may be typical software applications such as a spreadsheet, a database query program, and a communications program for faxing materials across phone lines. Below this layer is the currently active set of applications 205 and a special application called the Application Profile Generator 206. Five subsystems of the operating system software are shown in the layer beneath the applications. These are Scheduler 207, Power Management (PM) Executive 209, File System 210, Device Driver and Interrupt Handler Subsystem 211, and a Loader 212. Most operating systems also have a Virtual Memory Management subsystem which is not shown.

Applications 202, 203 and 204 are presented to an operating system by the Loader for execution. These applications may be either power management proactive (PM-proactive) applications 203 or power management unaware (PM-unaware) applications 204. A PM-unaware application is one which is not written to utilize the power management facilities of the operating system. However, as will be described below, PM-unaware applications may be augmented to communicate their resource requirements to the Scheduler via the addition of a Command Script 201 which runs prior to the invocation of an associated PM-unaware application 202. The Loader moves instructions and data representing an application from any of the various secondary storage devices into system memory and then generates a process to execute the application. A process is represented within the operating system Scheduler as a data structure maintained in the Process Table 208.

The Scheduler 207 receives control whenever the currently running application calls for operating system services (both preemptive and cooperative multi-tasking) or on a periodic timer interrupt (preemptive multi-tasking). The Scheduler has the responsibility of selecting the next process to run from the subset of processes in the process table which are ready to run. In determining which processes are ready to run the Scheduler, in a power management-enabled operating system, should take into account the current power state of the hardware resources required by the application. A process which requires the services of a device which is currently in a low-power non-responsive state is generally not ready to run.

In the preferred embodiment, a current power state of a hardware resource is considered to fulfill the required power state for a software process or application if the current power state matches or if the current power state is in a more ready power state than the required hardware resource power state. For example, consider a hard drive has four power states, in descending order of readiness, including high speed clock with drive spinning, slow speed clock with drive spinning, slow speed clock with drive not spinning, and clock off with drive not spinning. If a software process requires that the hard drive have a power state with a slow clock speed and the drive running, and if the hard drive is in a current power state with a high clock speed and the drive running, then the current power state fulfills the required power state. This is because the hard drive is in a more ready power state than is required by the software process. The hard drive may be in this more ready power state because of the requirements of another software process, and it would not be efficient to decrease the readiness of the hard drive just to perfectly match the latest request from a software process.

The power management policy execution module is referred to herein as the PM Executive 209. The PM Executive 209 receives system power state transition requests from PM-proactive applications 203 or via system services calls from Command Script 201. The PM Executive is also instrumental in effecting the transition of system resources from one power state to the next by sending commands to the appropriate device driver. The PM Executive receives event messages from device drivers or from interrupt handlers and can broadcast these event messages to all active applications. Only PM-proactive applications, however, will have the facilities to receive and act on these messages.

The Scheduler handles conflicts between required and available resources within the system. Typically, the goal of the Scheduler is to keep the CPU utilized as close to 100% of the time as possible. However, in a power management-enabled operating system, the Scheduler is enhanced to consider power usage and may use knowledge about the application's requirements to optimize performance within the current power constraints. Details are provided below on the manner in which the Scheduler may be implemented in the present invention.

The present invention includes some techniques to be used in a power management-enabled operating system. Information may be provided to the Scheduler concerning the resource requirements of applications prior to invocation. In addition, the operating system may be provided real time updates of the resource requirements as an application runs.

Furthermore, a command script language may be enhanced to include the specification of the system resource requirements of an application. An application developer can employ this mechanism to communicate the resource requirements of an application prior to its invocation. This allows a PM-unaware application to be upgraded to take advantage of the power management capabilities of the operating system without the cost of rewriting the application.

In addition, after invocation of the application, operating system service calls may be used by an application to inform the operating system of its resource requirements. This technique may be used in a couple of ways. First, system service calls in the initial section of an application may be employed to register with the scheduler the resources that the application is about to use. Secondly, the system service calls may be used later in the execution of the application to inform the scheduler of changes in the application's resource requirements.

There are many types of resource requirements that applications can register with the Scheduler. These types of resource requirements include four main categories in the preferred embodiment. Of course, one of ordinary skill in the art may appreciate other various possible categories and uses thereof.

In a first category, the application may provide a list of files to be accessed by the applications and the type of access. For example, the application may specify random, sequential, read only, read/write, write only, or isochronous access. The scheduler executes calls to the File System to associate file names or handles with various physical devices. In a second category, the applications may enumerate I/O devices (other than files) to be used by the applications, such as graphics, video, audio, CD-ROM, tape, LAN, modem, serial port and parallel port. In a third category, the applications may provide a characterization of the type of CPU utilization to be required by the application, such as mostly integer calculations, mostly floating point calculations, little or no calculations, or I/O intensive requirements. In a fourth category, the applications may characterize the application "footprint" size of the "kernel" of the application (where application spends the majority of its execution time) and the size of the working set of data required by the application.

The present invention also provides for an automatic generation of lists of resources required by an application. This may be accomplished by the special application called the Application Profile Generator 206. The Application Profile Generator can be invoked to monitor the resources utilized by various PM-unaware applications. The Operating System kernel sends messages to the Application Profile Generator as the monitored application accesses various system resources. These resources are recorded by this special application program. When the monitored application is terminated, the Application Profile Generator generates a command script with the appropriate instructions to register the resource requirements of the monitored application and saves it to the hardfile. In the preferred embodiment, this command script is marked preliminary. On subsequent invocations of the same application the Application Profile Generator can again monitor the resource usage of the application and compare it to that recorded during the previous invocation. If they match, at the second termination of the application, the automatically generated resource registration command script can be marked permanent. On subsequent invocations this command script will be used to register the application's resource requirements and monitoring its resource usage will no longer be required. However, if subsequent invocations show a deviation in the resource utilization of the monitored application, it may be preferable to monitor the execution of the application over several invocations and search for a common subset of resources which are utilized over and over again. If such a subset can be found then it may be preferable to mark the generated resource registration command script as permanent. Otherwise, the Application Profile Generator can mark the application as unpredictable and not attempt further profiling.

Figure 3:
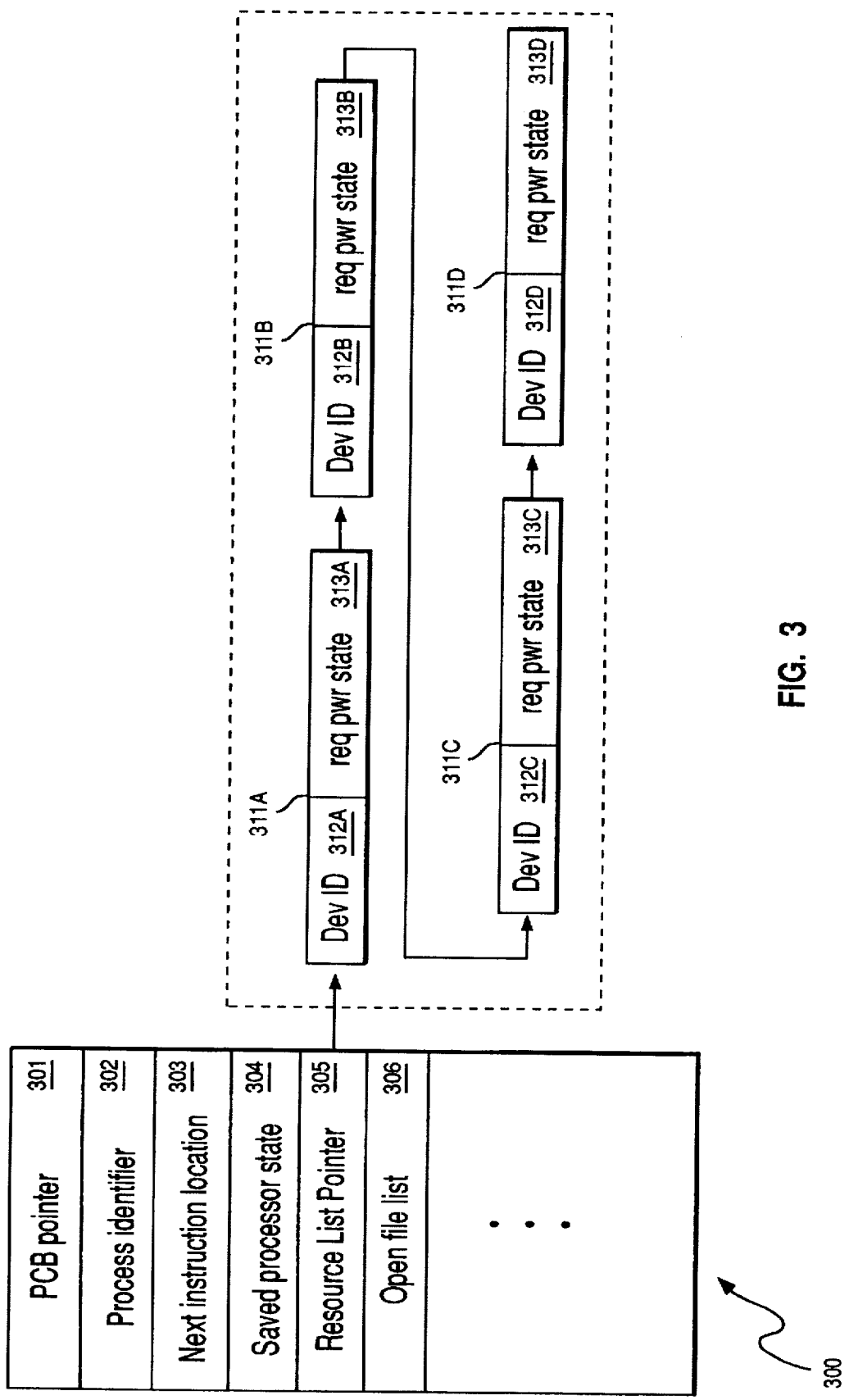
FIG. 3 is a block diagram which illustrates a process control block (PCB) utilized by the preferred embodiment of the invention.

FIG. 3 is a block diagram which illustrates a process control block (PCB) 300 utilized by a preferred embodiment of the invention. A process is a thread of execution of instructions and the set of system resources associated with it. Information concerning processes in most operating systems is maintained in a data structure called the process table. Each element of this data structure is called a process control block (PCB) and defines one process. Each PCB contains information such as a PCB pointer 301, a process identifier (ID) 302, a next instruction location 303 for indicating the resumption point of the thread of execution if the execution of the thread is interrupted, a saved processor state 304 including the contents of all processor registers, an open file list 306 including information concerning open files, and the location and size of defined data and instruction storage areas in system memory. PCB pointer 301 is utilized to organize a number of PCBs into various linked lists which represent queues as shown in FIG. 4 below.

A resource list 310 is also included in the PCB 300 which contains information defining the minimum power state requirements of the system resources which the process utilizes. This resource list 310 is pointed to by a resource list pointer 305. This pointer 305 of the PCB provides a pointer to a first entry 311A of the resource list. Entry 311A includes a device identifier (ID) 312A that identifies a device or system resource to be utilized by the process and a required power state 313A which provides the minimum power state the device needs to be in during execution of the current process. Additional entries in the resource list are included in a linked list in the preferred embodiment. As a result, the resource list 310 should include the desired power state for each of the devices to be utilized by the current process identified by the process ID.

Figure 4:
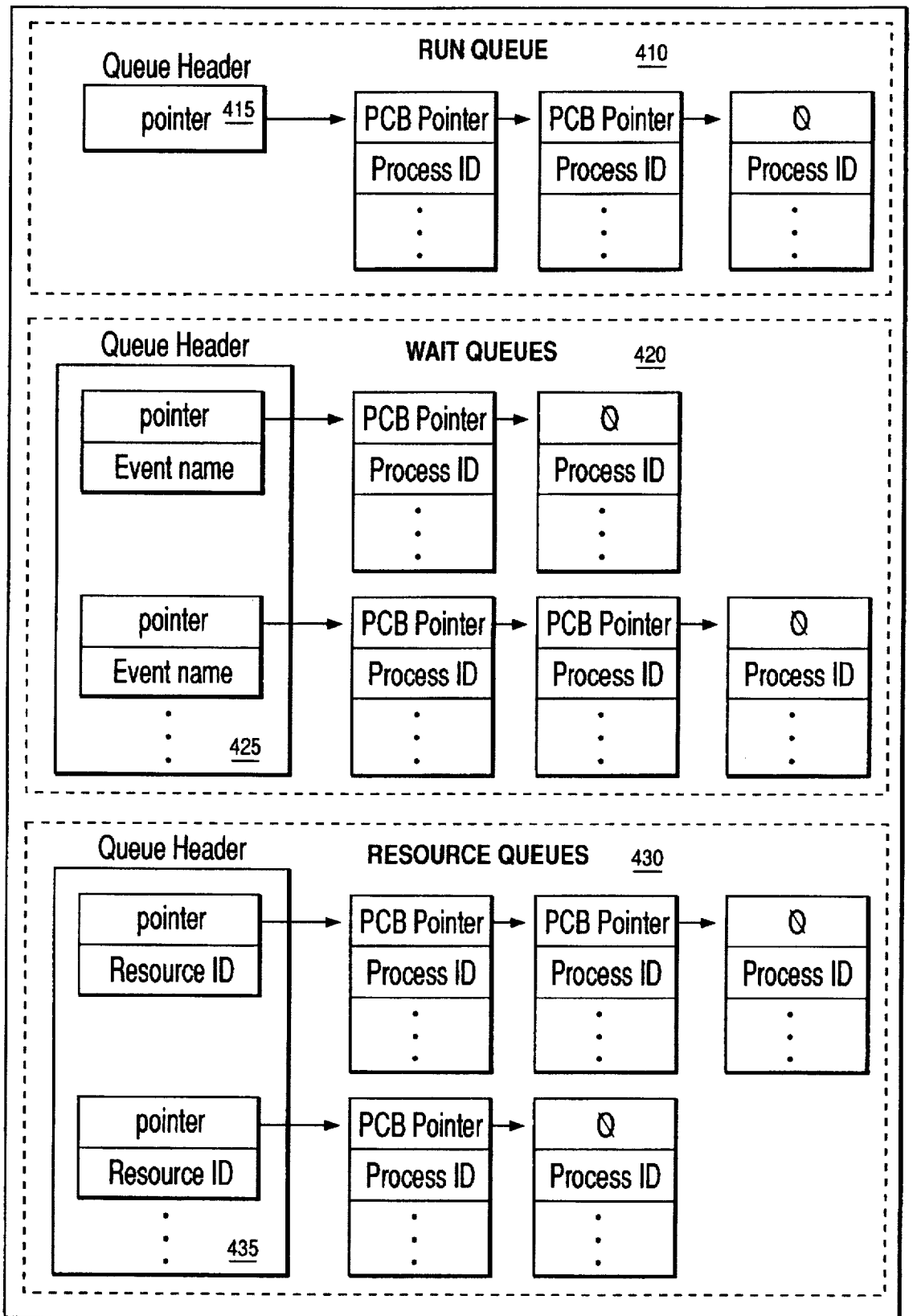
FIG. 4 is a block diagram illustrating utilization of the process control blocks according to the preferred embodiment of the invention.

FIG. 4 is a block diagram illustrating utilization of the PCBs according to a preferred embodiment of the invention. Process control in most operating systems is maintained by using linked lists which thread together the PCBs described in FIG. 3 in process table 400. These linked lists of PCBs represent queues of processes either waiting for specific system events (wait queue) or waiting on the availability of a processor to start or resume execution (run queue). The wait queue 420 is often implemented as a set of queues, one for each defined system event. The various wait queues are accessed via a wait queue header 425. The run queue 410 is accessed via the run queue header 415.

In the preferred embodiment, the process table is augmented with the addition of a set of resource queues 430. A process is placed on a resource queue whenever it is unable to run due to a mismatch between the current power state of a resource and the required power state as defined in the resource list for that process. The various resource queues are accessed via the resource queue header 435. Utilization of this process table is described in greater detail below.

Figure 5:
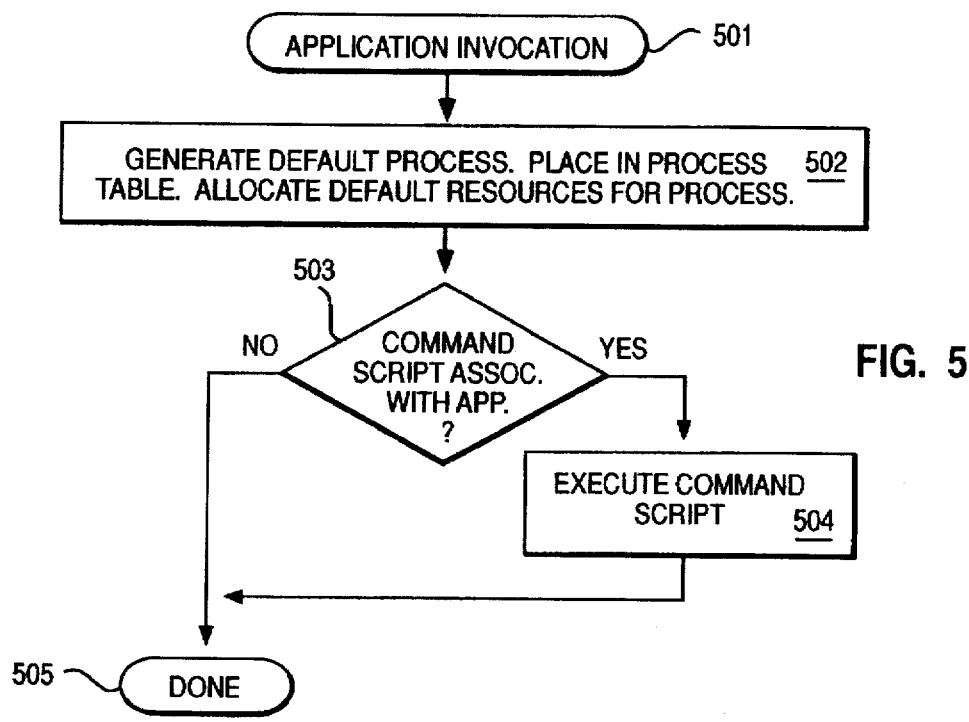
FIG. 5 is a flowchart which illustrates a systems service procedure called application invocation according to the preferred embodiment of the invention.

FIG. 5 is a flowchart which illustrates a systems service procedure called application invocation according to a preferred embodiment of the invention. This system service is usually called from the Loader which is initiated as a result of a user command to run an application. The purpose of the application invocation procedure is to generate a default process to execute an application program which the Loader has placed in memory. The procedure begins at block 501 with the system call to the procedure. The first procedure block 502 defines a default process and adds it to the process table. A default resource list is generated and associated with the PCB for this process. Control flows immediately to a decision block 503 where the procedure checks for the existence of an associated command script.

If an associated command script exists, then it is executed in procedure block 504. The command script contains system calls which register the application's resource requirements. Registration of resource requirements involves adding elements to the resource list and initializing the required power state field of the new element. The "No" leg of the decision block 503 joins the flow out of block 504 to end the procedure at the termination block 505.

Figure 6:
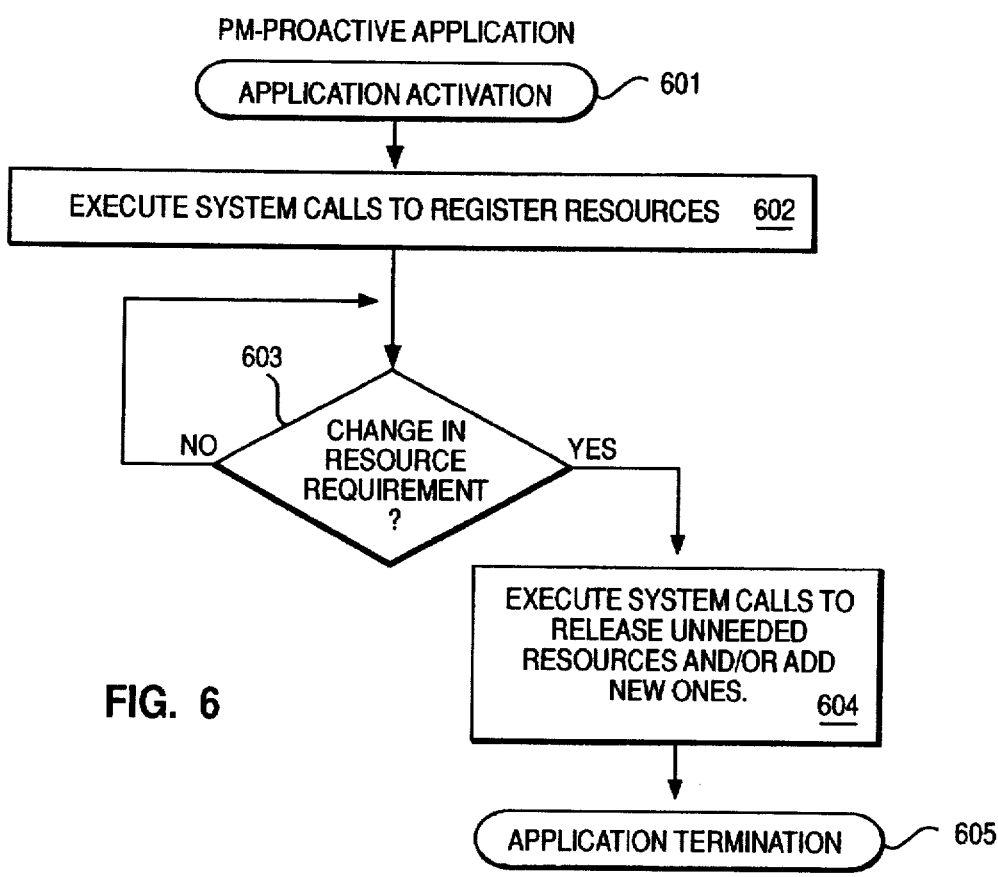
FIG. 6 is a flowchart which illustrates the execution of a PM-proactive application program according to the preferred embodiment of the invention.

FIG. 6 is a flowchart which illustrates the execution of a PM-proactive application program. In order to provide clarity, the aspects of the execution that affect the resource list are addressed in this procedure diagram. This procedure begins at start block 601 which logically follows the termination block of the procedure diagrammed in FIG. 5. The first procedure block 602 represents system services calls which a PM-proactive application would normally execute early after its invocation to register its resource requirements. The decision block 603 is not to be construed as a literal infinite loop, but represents the period of time during which the application's resource requirements remain unchanged. If the application terminates without needing to modify the registry of its resource requirements flow would pass to the termination block 605. If, however, it is appropriate to modify the registered resource requirements of the application, the procedure would fall through the "Yes" leg of the decision block 603 to block 604 where the application updates the resource list via appropriate system calls. The application is allowed to make subsequent modifications to its resource requirements list (not shown). When the application terminates in block 605, the resource list associated with the process is automatically released, thereby notifying the operating system that the process no longer needs the previously requested set of hardware resources. The operating system may then use this information to change the power state of those hardware resources to a lower state unless those resources are also needed by other software processes.

Figure 7:
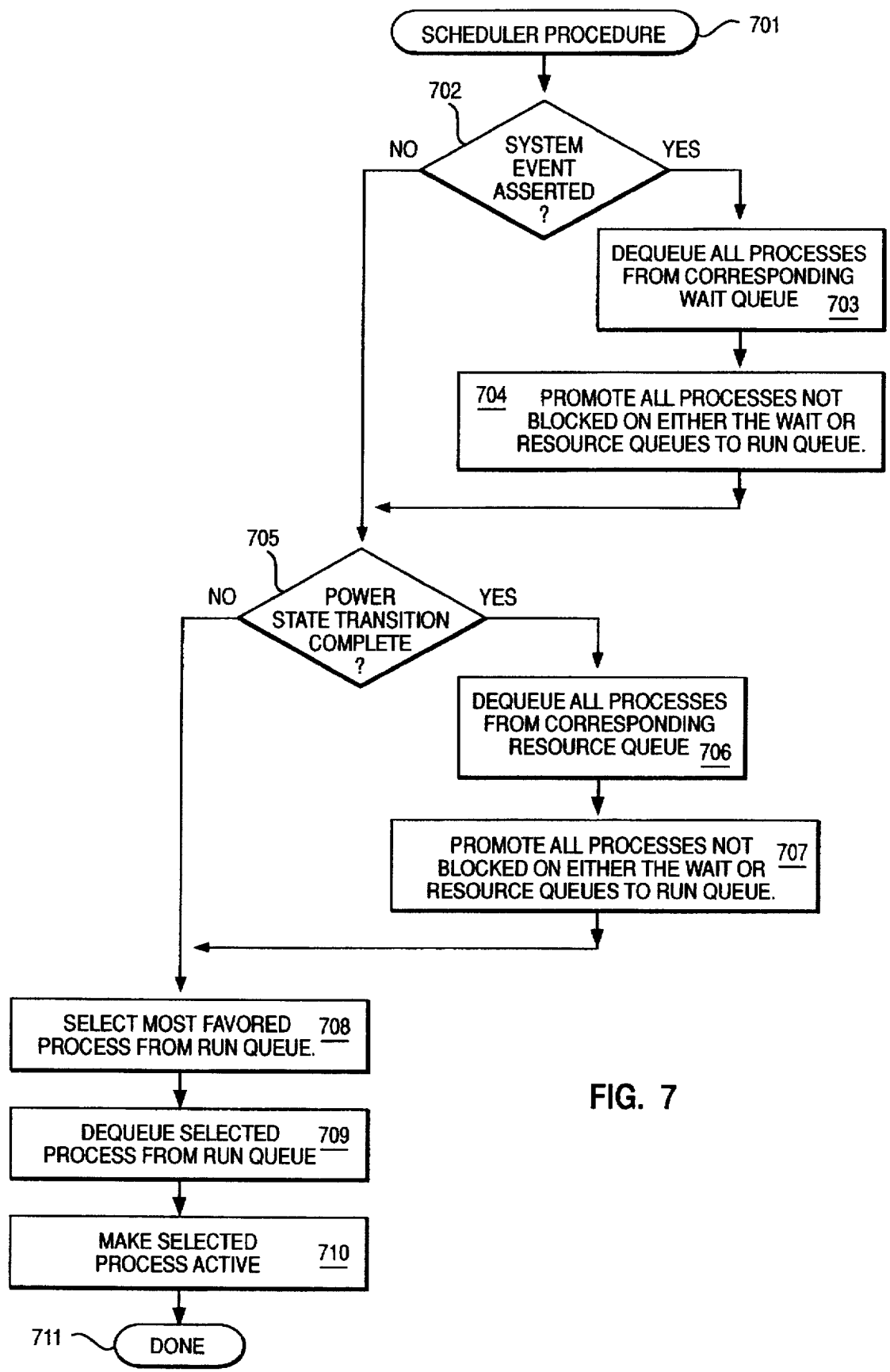
FIG. 7 is a flowchart which illustrates the procedure executed by the Scheduler whenever it receives control according to the preferred embodiment of the invention.

FIG. 7 is a flowchart which illustrates the procedure executed by the Scheduler whenever it receives control according to a preferred embodiment of the invention. This occurs whenever a user process is preempted due to a system call or the expiration of the process time quantum. This procedure begins at the start block 701. Decision block 702 checks for the assertion of one or more system events. System events might be used for process synchronization or to communicate significant events such as the completion of an I/O request to a waiting process. If a system event is asserted the flow specifies the execution of block 703 in which all processes waiting on this specific event are removed from the corresponding wait queue. If more than one system event has occurred the procedure would iterate dequeuing waiting processes from the corresponding wait queue. Flow passes unconditionally to block 704 in which all processes removed from the wait queue or queues are potentially promoted to the run queue. A process is promoted to the run queue if it is not blocked waiting on any other system event AND it has all its resource requirements satisfied. Flow from the "No" leg of decision block 702 joins the flow from block 704 as the procedure executes decision block 705. This decision block tests for any power state transition completion messages from the Power Management Executive. If one or more of these messages are posted, flow passes to block 706. Procedure block 706 scans the resource queue corresponding to the system resource which has just completed a power state transition. It dequeues all processes on this queue which now have their requirements satisfied. If more than one system resource has completed a power state transition, the procedure is iterated for the next resource queue. Flow passes to block 707 where all processes which are no longer blocked waiting on either a system event or a system resource power state transition are promoted to the run queue. Flow from the "No" leg of the decision block 705 joins the flow out of block 707 at procedure block 708. This block represents the action of picking the most favored process off the run queue. This process is removed from the run queue in block 709 and made the active process in block 710. Flow passes to the termination block 711 to complete the description of this procedure.

Figure 8:
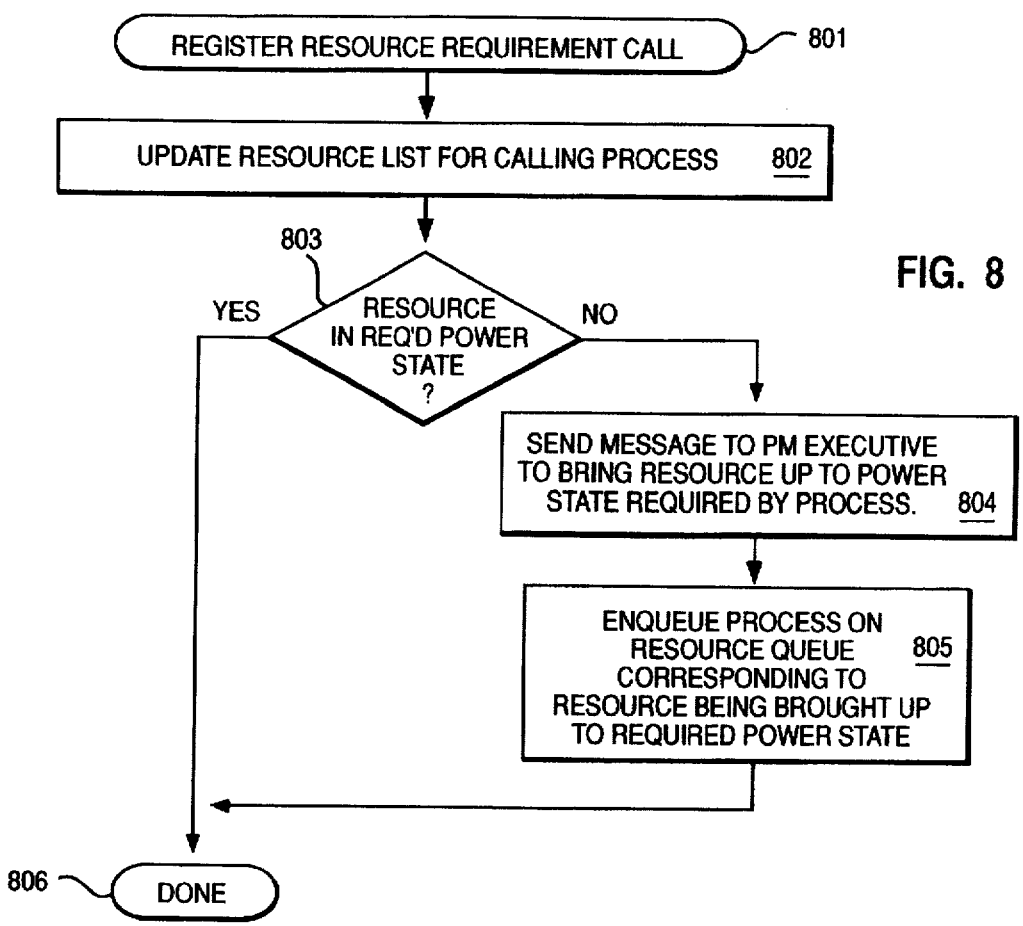
FIGS. 8, 9 and 10 are flowcharts which illustrate procedures for three different types of system calls according to the preferred embodiment of the invention.
Figure 9:
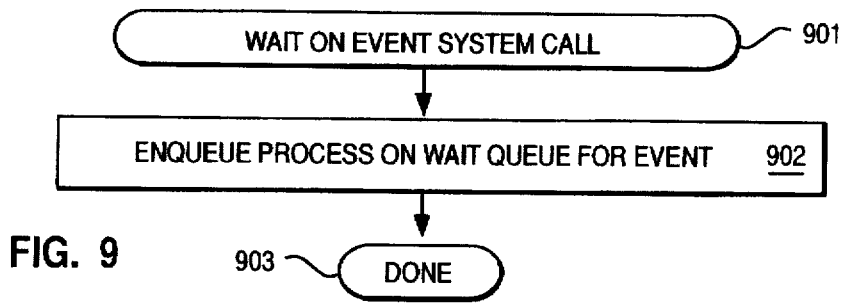
Figure 10:
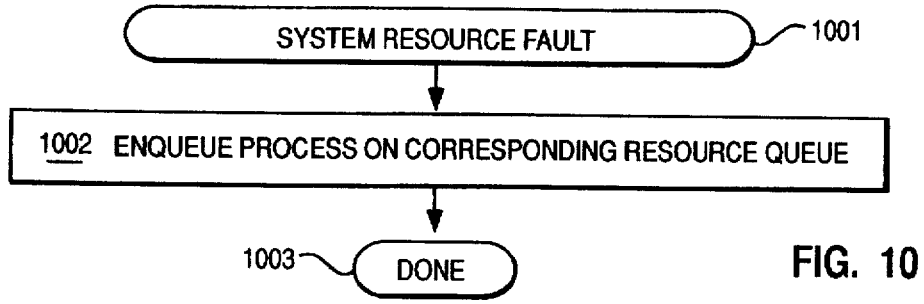

FIGS. 8, 9 and 10 are flowcharts which illustrate procedures for three different types of system calls according to the preferred embodiment of the invention. The procedure shown in FIG. 8 has been described herein as the primary mechanism for resource requirements to be registered with the operating system kernel. This procedure begins at block 801. This procedure is called from a PM-proactive application or on behalf of a PM-unaware application via a command script. Procedure block 802 updates the resource list associated with the calling processes PCB in case of the PM-proactive application or according to the process ID of the PM-unaware application when the resource registration call is made from a command script. If the resource registration call specifies removing the requirement for a specific system resource, the process should be removed from the corresponding resource queue. In addition block 802 can make a decision to send a message to the PM Executive to initiate the transition of a system resource to a lower power state based on a scan of all resource lists in the process table. If no process has currently declared a need for the resource it may be wise to initiate a transition of this resource to a lower power state. Flow passes to a decision block 803. If a required resource is not currently in the requested power state, flow passes to block 804 where a message is generated to the PM Executive to initiate a transition to the required state. Flow continues in block 805 where processes which have just registered their need for a resource which is not currently at an adequate power state are added to the resource queue for that resource. The flow from the "Yes" leg of decision block 803 joins with the flow out of block 805 at the termination block 806.

FIG. 9 starting with block 901 shows the procedure for placing a process on a wait queue. The procedure starts in block 901, executes block 902, and terminates in block 903.

FIG. 10 shows the procedure which is triggered by a system resource fault. A system resource fault occurs when a process requests the use of a system resource which is not currently in a power state in which it can meet the registered power state requirement of the process. The System resource fault procedure starts in block 1001, proceeds to block 1002, and terminates in block 1003.

There are many advantages to the present invention. For example, the present invention allows for scheduling of processes or applications based on their total resource and power requirements. In addition, the present invention allows scheduling of processes or applications based on the current power state of the set of resources utilized by each process or application. Furthermore, the present invention allows processes or applications to provide advanced notice of the need for a resource, thereby allowing the system software to bring a resource to the power state that satisfies the process prior to the point where the process actually requires the resource. The present invention also allows system software to optimize subsystem power consumption while avoiding resource availability delays. The present invention further allows system software to more accurately estimate critical low power condition based on the current application workload. In addition, the resource requirement registry process provides for the successful operation of multimedia and other realtime applications in a power managed system without having to disable power management features whenever realtime applications are active on the system.

Although the description of the preferred embodiment above uses the example of a single central processing unit, this should not be construed to limit this invention to uniprocessor systems. A use of a symmetrical multiprocessor system as the processing element in the system is a reasonable alternate embodiment.

Although the present invention has been fully described above with reference to specific embodiments, other alternative embodiments will be apparent to those of ordinary skill in the art. Therefore, the above description should not be taken as limiting the scope of the present invention which is defined by the appended claims.

What is claimed is:

1. An apparatus for managing power states of hardware resources of a computing system comprising:

means for receiving a service call from a software process;

means, responsive to said service call, for registering a power state of at least one hardware resource to be utilized by an application program; and means for comparing a current power state of said at least one hardware resource to said registered power state and means for modifying said current power state prior to executing said application program if said current power state is lower than said registered power state.

2. The apparatus of claim 1 wherein said computing system is a multi-tasking computing system, said means for receiving includes means for receiving service calls from a first set of software processes, said means for registering includes means for registering power states of hardware resources to be utilized by said first set of software processes, and said means for modifying includes means for modifying power states of hardware resources to be utilized by said first set of software processes if current power states are lower than said registered power states.

3. The apparatus of claim 2 wherein a second set of software processes are executed before said step of modifying if current power states of hardware resources to be used by both the first and the second set of software processes are equal or higher than power states registered in response to service calls received from said second set of software processes.

4. The apparatus of claim 2 wherein additional hardware resource power states are registered during execution of said first set of software processes.

5. The apparatus of claim 2 wherein an operating system maintains a history of a second set of said plurality of software processes for determining what hardware resource power states correspond to said second set of software processes.

6. The apparatus of claim 5 wherein said application program is a software process.

7. A method for managing power states of hardware resources of a computing system comprising the steps of:

receiving a service call from a software process;

registering, in response to said service call, a power state of at least one hardware resource to be utilized by an application program; and comparing a current power state of said at least one hardware resource to said registered power state and modifying said current power state prior to executing said application program if said current power state is lower than said registered power state.

8. The method of claim 7 wherein said computing system is a multi-tasking system, said step of receiving includes the step of receiving service calls from a first set of software processes, said step of registering includes the step of registering power states of hardware resources to be utilized by said first set of software processes, and said step of modifying includes the step of modifying power states of hardware resources to be utilized by said first set of software processes if current power states are lower than said registered power states.

9. The method of claim 8 wherein a second set of said software processes are executed before said step of modifying if current power states of hardware resources to be used by both the first and the second set of software processes are equal or higher than power states registered in response to service calls received from said second set of software processes.

10. The method of claim 8 wherein additional hardware resource power states are registered during execution of said first set of software processes.

11. The method of claim 8 wherein an operating system maintains a history of a second set of said plurality of software processes for determining what hardware resource power states correspond to said second set of software processes.

12. The method of claim 11 wherein said application program is a software process.

13. The method of claim 10 wherein said first set of software processes being executed initiates service calls for either itself and/or a second set of software processes.

14. A data processing system for managing power states of hardware resources of a computing system comprising:
   a memory for storing data to be processed;
   a processor for processing data;
   means for receiving a service call from a software process;
   means, responsive to said service call, for registering a power state of at least one hardware resource to be utilized by an application program; and
   means for comparing a current power state of said at least one hardware resource to said registered power state and means for modifying said current power state prior to executing said application program if said current power state is lower than said registered power state.

15. The data processing system of claim 14 wherein said computing system is a multi-tasking computing system, said means for receiving includes means for receiving service calls from a first set of software processes, said means for registering includes means for registering power states of hardware resources to be utilized by said first set of software processes, and said means for modifying includes means for modifying power states of hardware resources to be utilized by said first set of software processes if current power states are lower than said registered power states.

16. The data processing system of claim 15 wherein a second set of software processes are executed before said step of modifying if current power states of hardware resources to be used by both the first and the second set of software processes are equal or higher than power states registered in response to service calls received from said second set of software processes.

17. The data processing system of claim 15 wherein additional hardware resource power states are registered during execution of said first set of software processes.

18. The data processing system of claim 15 wherein an operating system maintains a history of a fourth set of said plurality of software processes for determining what hardware resource power states correspond to said fourth set of software processes.

19. The data processing system of claim 18 wherein said application program is a software process.

20. The data processing system of claim 17 wherein said first set of software processes being executed initiates service calls for either itself and/or a second set of software processes.

21. A computer program product stored in memory and executable by a processor for managing power states of hardware resources of a computing system comprising:
   means, stored in memory, for receiving a service call from a software process;
   means, stored in memory and responsive to said service call, for registering a power state of at least one hardware resource to be utilized by an application program; and
   means, stored in memory, for comparing a current power state of said at least one hardware resource to said registered power state and for modifying said current power state prior to executing said application program if said current power state is lower than said registered power state.

22. The computer program product of claim 21 wherein said computing system is a multi-tasking computing system, said means stored in memory for receiving includes means for receiving service calls from a first set of software processes, said means stored in memory for registering includes means for registering power states of hardware resources to be utilized by said first set of software processes, and said means stored in memory for modifying includes means for modifying power states of hardware resources to be utilized by said first set of software processes if current power states are lower than said registered power states.

23. The computer program product of claim 22 wherein a second set of software processes are executed before said step of modifying if current power states of hardware resources to be used by both the first and the second set of software processes are equal or higher than power states registered in response to service calls received from said second set of software processes.

24. The computer program product of claim 22 wherein additional hardware resource power states are registered during execution of said first set of software processes.

25. The computer program product of claim 22 wherein an operating system maintains a history of a second set of said plurality of software processes for determining what hardware resource power states correspond to said second set of software processes.

26. The computer program product of claim 25 wherein said application program is a software process.

27. The computer program product of claim 24 wherein said first set of software processes being executed initiates service calls for either itself and/or a second set of software processes.

28. An apparatus for obtaining power states of at least one hardware resource, comprising:
   means for requesting at least one hardware resource power state corresponding to a software process, said requesting means including means for receiving a service call from a command script, said command script being written by a user if said software process is power management unaware;
   means for waiting for a response that confirms a current hardware resource power state fulfills said requested hardware resource power state; and
   means for executing the software process upon receiving the response.

29. The apparatus of claim 28 further comprising means for suspending execution of the software process and for requesting at least one hardware resource power state corresponding to the software process while the execution of the software process is suspended.

30. A method of obtaining power states of at least one hardware resource, comprising the steps of:
   requesting at least one hardware resource power state corresponding to a software process, said step of requesting including the step of receiving a service call from a command script written by a user if said software process is power management unaware;
   waiting for a response that confirms a current hardware resource power state fulfills said requested hardware resource power state; and
   executing the software process upon receiving the response.

31. The method of claim 30 further comprising a step of suspending execution of the software process and requesting at least one hardware resource power state corresponding to the software process while the execution of the software process is suspended.

32. A computer program product stored in memory and executable by a processor for obtaining power states of at least one hardware resource, comprising:

means, stored in memory, for requesting at least one hardware resource power state corresponding to a software process, said requesting means including means stored in memory for receiving a service call from a command script written by a user if said software process is power management unaware;

means, stored in memory, for waiting for a response that confirms a current hardware resource power state fulfills said requested hardware resource power state; and means, stored in memory, for executing the software process upon receiving the response.

33. The computer program product of claim 32 further comprising means, stored in memory, for suspending execution of the software process and for requesting at least one hardware resource power state corresponding to the software process while the execution of the software process is suspended.

34. The apparatus of claim 4 wherein said first set of software processes being executed initiates service calls for either itself and/or a second set of software processes.

35. An apparatus for scheduling executions of software processes in a multi-tasking computing system comprising:

means for receiving required minimum power states of hardware resources to be utilized by said software processes;

means for determining current power states of said hardware resources; and means, responsive to said receiving and determining means, for scheduling execution of said software processes.

36. The apparatus of claim 35 wherein software processes using hardware resources with required minimum power states meeting current power states of said hardware resources are scheduled to be executed first.

37. The apparatus of claim 36 wherein software processes using hardware resources with required minimum power states being next levels of current power states of said hardware resources are scheduled to be executed next.

38. The apparatus of claim 37 wherein upgrading current power states of said hardware resources to said next levels of power states occurs during execution of software processes.

39. A method of scheduling executions of software processes in a multi-tasking computing system comprising the steps of:

receiving required minimum power states of hardware resources to be utilized by said software processes;

determining current power states of said hardware resources; and using said minimum power states and said current power states to schedule execution of said software processes.

40. The method of claim 39 wherein software processes using hardware resources with required minimum power states meeting current power states of said hardware resources are scheduled to be executed first.

41. The method of claim 40 wherein software processes using hardware resources with required minimum power states being next levels of current power states of said hardware resources are scheduled to be executed next.

42. The method of claim 41 wherein upgrading current power states of said hardware resources to said next levels of power states occurs during execution of software processes.

43. A computer program product stored in memory and executable by a processor for scheduling executions of software processes in a multi-tasking computing system comprising:

computer executable means for receiving required minimum power states of hardware resources to be utilized by said software processes;

computer executable means for determining current power states of said hardware resources; and computer executable means, responsive to said receiving and determining means, for scheduling execution of said software processes.

44. The computer program product of claim 43 wherein software processes using hardware resources with required minimum power states meeting current power states of said hardware resources are scheduled to be executed first.

45. The computer program product of claim 44 wherein software processes using hardware resources with required minimum power states being next levels of current power states of said hardware resources are scheduled to be executed next.

46. The computer program product of claim 45 wherein upgrading current power states of said hardware resources to said next levels of power states occurs during execution of software processes.

\* \* \* \* \*